United States Patent [19]
Petrucelli et al.

[11] Patent Number: 5,929,391
[45] Date of Patent: *Jul. 27, 1999

[54] LOAD CELL FOR AN ELECTRICAL WEIGHING SCALE

[75] Inventors: Steven P. Petrucelli, Cranbury; Damon Germanton, Kinnelon, both of N.J.

[73] Assignee: Measurement Specialties, Inc., Fairfield, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,624

[22] Filed: May 2, 1996

[51] Int. Cl.⁶ ............................... G01G 3/14; G01G 3/08
[52] U.S. Cl. ...................... 177/211; 177/229; 73/862.627
[58] Field of Search ...................... 73/862.627, 862.632, 73/862.634, 862.637, 862.639; 177/211, 229, DIG. 9

[56] References Cited

U.S. PATENT DOCUMENTS

| | | | |
|---|---|---|---|
| 924,962 | 6/1909 | Boling | 177/229 |
| 4,291,776 | 9/1981 | Kupper et al. | 177/229 |
| 4,297,875 | 11/1981 | Kuhnle et al. | 177/211 |
| 4,340,777 | 7/1982 | DeCosta et al. | 177/211 |
| 4,355,692 | 10/1982 | Ostrelich | 177/211 |
| 4,433,741 | 2/1984 | Ryckman, Jr. | 177/211 |
| 4,492,279 | 1/1985 | Speckhart | 177/45 |
| 4,542,800 | 9/1985 | Knothe et al. | 177/211 |
| 4,548,086 | 10/1985 | Kästel | 73/862.627 |
| 4,744,428 | 5/1988 | Knotter et al. | 177/127 |
| 4,848,493 | 7/1989 | Hitchcock | 177/211 |
| 4,951,765 | 8/1990 | Naito et al. | 177/211 |
| 5,510,581 | 4/1996 | Angel | 177/211 |
| 5,510,784 | 4/1996 | Polaert et al. | 73/862.634 |

*Primary Examiner*—Randy W. Gibson
*Attorney, Agent, or Firm*—Arthur L. Plevy

[57] ABSTRACT

A load cell for an electronic scale, which is capable of providing both load support and load measurement in a planar member. This is accomplished by configuring the load cell as a substantially flat circular plate having an E-shaped deflectable member defined therein. The E-shaped member includes three beams, at least one of which includes a sensor arrangement that responds to a load applied to the deflectable member by generating an electrical signal that is indicative of the load applied to the E-shaped member.

14 Claims, 4 Drawing Sheets

LOAD CELL FOR AN ELECTRICAL WEIGHING SCALE

RELATED APPLICATIONS

The Assignee herein, Measurement Specialties, Inc. is the record owner of U.S. patent application Ser. No. 08/385,349, entitled ELECTRICAL WEIGHING SCALE, by Petrucelli et al., filed on Feb. 8, 1995, and assigned to Measurement Specialties, Inc., the Assignee herein.

FIELD OF THE INVENTION

This invention relates generally to load cells, and more particularly to a load cell which provides both load support and load measurement in a planar member.

BACKGROUND OF THE INVENTION

Many electronic weighing scales use electrical sensors to provide electrical signals indicative of a weight applied to the scale. For example, see co-pending U.S. patent application, Ser. No. 08/385,349, entitled "ELECTRICAL WEIGHING SCALE", by Petrucelli et al., filed on Feb. 8, 1995, and assigned to Measurement Specialties, Inc.

Most of these electronic scales also use a set of levers which transmit an applied load to a single load cell. The load cell is typically constructed as a mechanically-deformable element which operates as a force transducer and an electronic strain sensor. When a load is applied to such a load cell, the load cell mechanically deforms and produces an electrical signal which is proportional to the load applied to the load cell. These lever arrangements, however, are overly complex, require close tolerance components and must be properly aligned to function accurately.

Attempts have been made in the prior art to construct scales without levers. One such design includes a scale with a plurality of load cells. When a load is applied to the scale, the load is distributed among all the load cells. Electrical signals generated by each of the load cells are then summed up to obtain an accurate measure of the total load on the scale. Several patents have been issued for electronic scales which embody this principle. For example, see U.S. Pat. No. 4,040,686 issued to Brendel and U.S. Pat. No. 4,411,327 issued to Lockery.

Brendel and Lockery both use a well-known double-cantilever arrangement for retaining precision under eccentric load conditions. In particular, two strain gauges are bonded to a flexure beam, whereby upon the application of a load, one gauge is placed in tension and the other gauge is placed in compression of an equal magnitude, so that additional moments created by transverse forces are cancelled. The signal generated by the two strain sensors bonded to the flexure beam is proportional to the sum of the bending moments on the beam at the center points of the gauges. Since the sensors are located on the beam at locations which are equi-distant from the beam's mid-point, a force pressing on the leading edges of the beam will be proportional to the product of the force and the distance between the sensors. Since the distance between the sensors is fixed, the signal will be proportional to the force even if the force is not exactly at the center of the flexure beam.

The load cells described in Lockery and Brendel, however, are not easily mass produced. They each contain a relatively large number of parts and each require considerable machining, grinding, tapping, screwing, assembly and post-mounting trimming operations which substantially increase their manufacturing costs.

Another type of load cell is disclosed in U.S. Pat. No. 4,993,506 issued to Angel. This patent discloses a load cell which uses a flat flexure beam on which strain sensors are bonded. A flat U-shaped loading element is attached to one end of the flexure beam and a flat mounting element is attached to the other end of the flexure beam. The problem with this type of load cell is that it also requires several mounting operations.

Accordingly, it is an object of the present invention to provide an improved load cell for a scale that is highly reliable yet substantially simple and economical to manufacture.

SUMMARY OF THE INVENTION

A load cell for an electronic scale, comprising a substantially flat plate having at least one C-shaped aperture, the at least one C-shaped aperture defining a substantially E-shaped deflectable member having three beams which form the arms of the substantially E-shaped deflectable member. Sensor means are disposed on at least one of the three beams, for generating an electrical signal in response to a load applied to the E-shaped deflectable member of the load cell, the electrical signal being indicative of the load.

Also described is an electronic scale for displaying the weight of a load applied to the scale. The scale comprises a platform and a plurality of support members attached to the platform for elevating the platform above a supporting surface. Each of the support members includes a load cell as described above. The scale further includes display means for receiving the electrical signals generated by the load cells in each of the support members and displaying the weight of the load.

BRIEF DESCRIPTION OF THE DRAWINGS

For a detailed understanding of the present invention, reference should be made to the following drawings wherein.

DETAILED DESCRIPTION OF THE DRAWINGS

Figure 1:
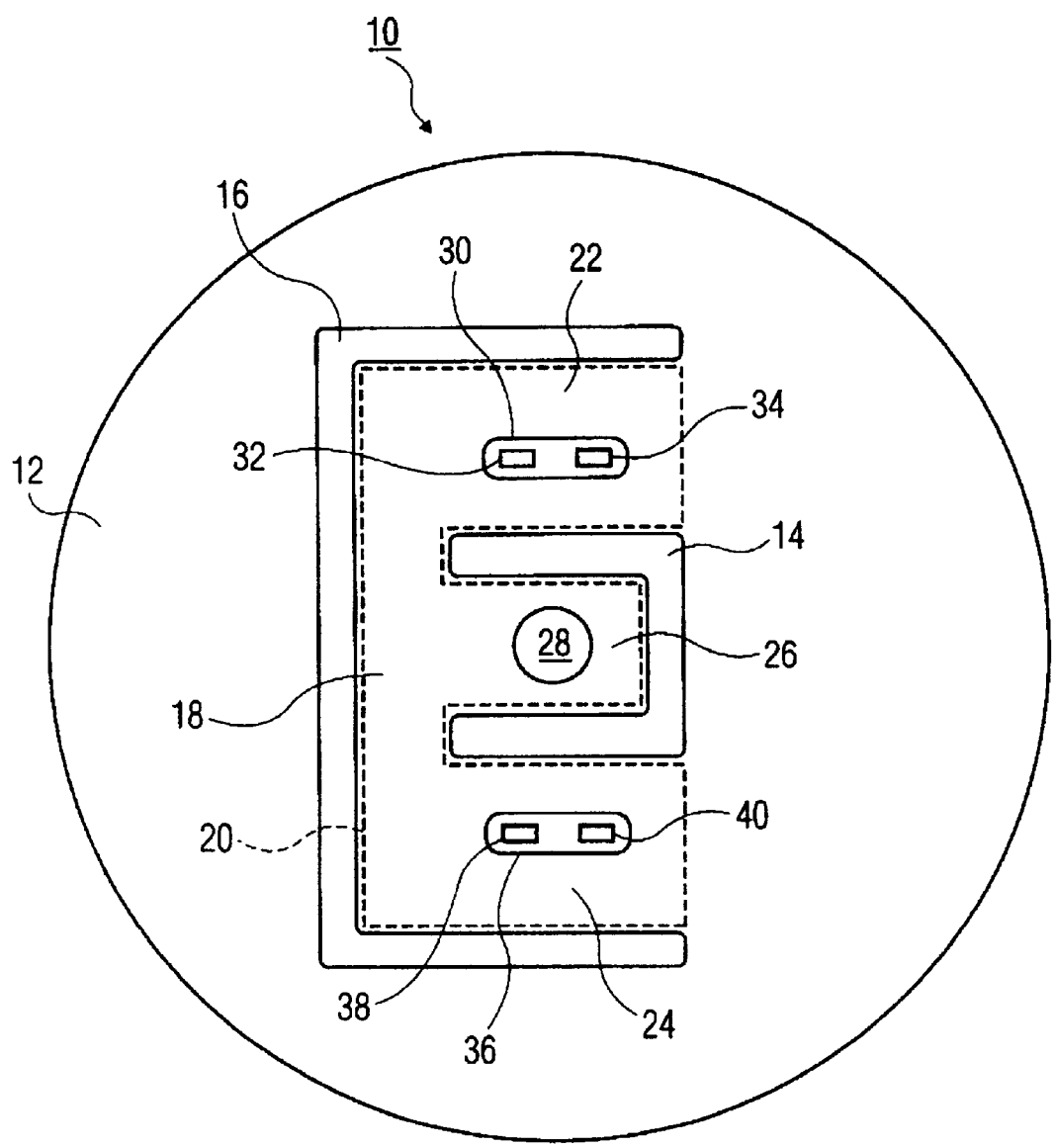
FIG. 1 is a plan view of a first embodiment of the load cell of the present invention.

Referring to FIG. 1, a load cell 10 according to a first embodiment of the present invention is shown. Generally, the load cell 10 comprises a substantially flat, circular plate 12 fabricated from sheet metal.

Defined in the plate 12 are first and second C-shaped apertures 14 and 16 which face toward one another. As shown, second C-shaped aperture 16 is larger than the first C-shaped aperture, and surrounds it to define an E-shaped deflectable member 18 (the outline of which is generally shown with dotted line 20). As can be seen, the E-shaped deflectable member 18 comprises first and second outer beams 22 and 24, and an inner beam 26. The first and second outer beams 22 and 24, hinge the deflectable member 18 to the flat plate 12. The inner beam 26 includes a substantially conical-shaped projection 28 for concentrating an applied load to the deflectable member 18 of the load cell 10 as will be later explained.

A first half bridge structure 30 consisting of a pair of series coupled piezoresistive sensing elements 32 and 34, is disposed on the first outer beam 22 and a second half bridge structure 36 consisting of a second pair of series coupled piezoresistive sensing elements 38 and 40, is disposed on the second outer beam 24. The first and second half bridge structures 30 and 36 are coupled together in parallel (cross-coupled).

When a load is applied to the projection 28 of the inner beam 26 of the deflectable member 18, the first and second outer beams 22 and 24 bend in response to the applied load. The bending of the beams places one of the two sensing elements on each of the outer beams 22 and 24 into tension and the other one of the two sensing elements into compression thereby generating an electrical signal that is indicative of the load applied to the deflectable member 18. The structure and operation of such piezoresistive sensing structures are well known in the art. Further, such sensing structures are described in copending U.S. patent application Ser. No. 08/385,349, the disclosure of which is incorporated herein by reference. In any case, it should be understood, that other well known strain sensor arrangements can be employed on the outer beams of the load cell of the present invention, if desired.

Figure 2:
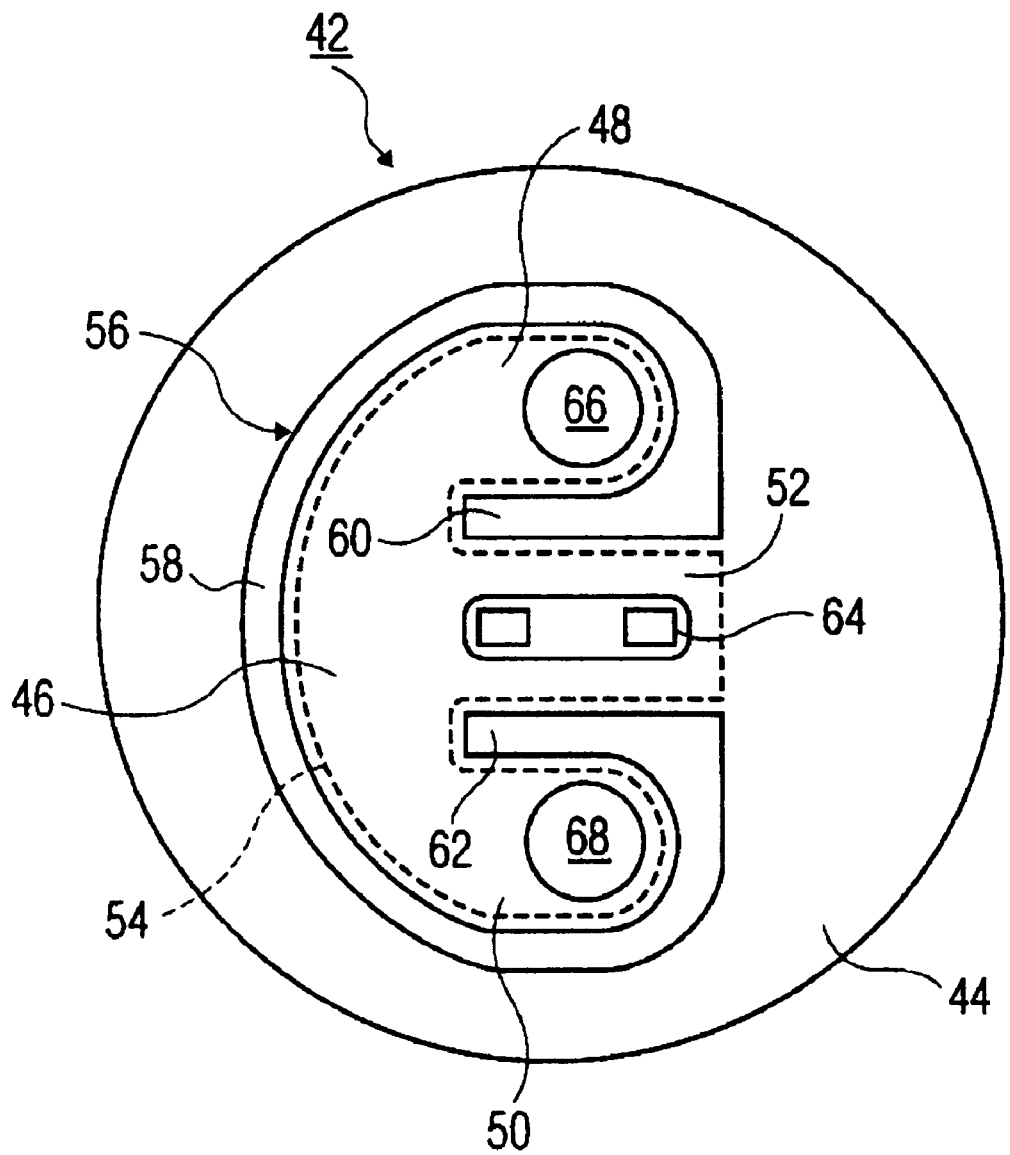
FIG. 2 is a plan view of a second embodiment of the load cell of the present invention.

Referring to FIG. 2, a second embodiment of the load cell of the present invention is shown and denoted by the numeral 42. The load cell 42 comprises a substantially flat, circular plate 44 with an E-shaped deflectable member 46 having first and second outer beams 48 and 50, and an inner beam 52 (the outline of which is generally shown with dotted line 54) similar to the load cell 10 of FIG. 1. However, the deflectable member 46 of the load cell 42 is defined by a single C-shaped aperture 56 formed in the plate 12. The aperture 56 includes an intermediate portion 58, a first end 60 and a second end 62. The first and second ends 60 and 62 loop around toward the intermediate portion 58 of the aperture 56. Accordingly, the E-shaped deflectable member 46 is hinged to the plate 44 by only the inner beam 52.

A strain sensing arrangement 64 similar to the arrangement of FIG. 1 (or any other suitable sensing arrangement) is disposed on the inner beam 52. A first substantially conical-shaped projection 66 is formed on the first outer beam 48, and a second substantially conical-shaped projection 68 is formed on the second outer beam 50. The first and second projections 66 and 68 concentrate any applied load to the deflectable member 46 of the load cell 42.

When a load is applied to the projections 66 and 68 of the outer beams of the deflectable member 46, the inner beam 52 bends in response to the applied load. The bending of the inner beam 52 creates a strain within the strain sensing arrangement 64 as was described with respect to the embodiment of FIG. 1, such that the sensing arrangement 64 generates an electrical signal that is indicative of the load applied to the deflectable member 46.

As should be now apparent, the load cell of the present invention provides both load support and load measurement in a single planar member. This enables the load cell of the present invention to be employed in many different applications involving the measurement of weight.

Figure 3:
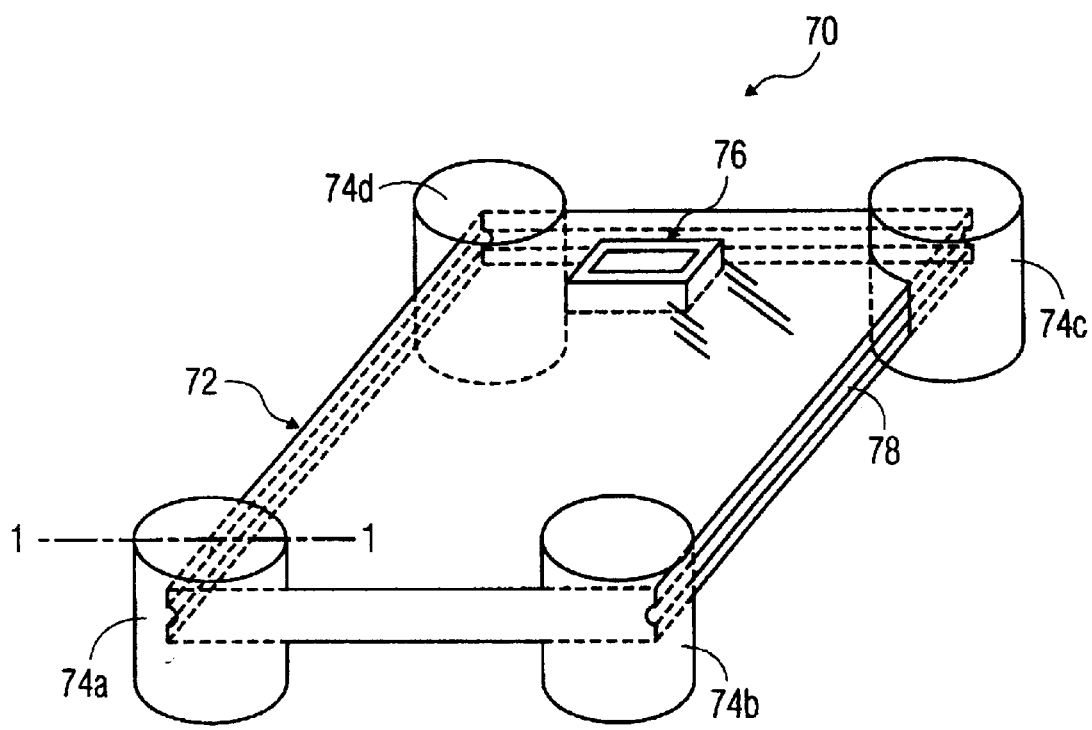
FIG. 3 is a perspective view of an electrical weighing scale employing the load cell of the present invention.

For example, in FIG. 3, there is shown a scale 70 similar to one described in the earlier-mentioned copending U.S. patent application Ser. No. 08/385,349. The scale 70 of FIG. 3 employs load cells made in accordance with the first embodiment of the present invention.

Generally, the scale 70 comprises a transparent platform 72, circularly-shaped support members 74a, 74b, 74c and 74d at each corner of the platform 72 and a display assembly 76. Each support member 74a–74d contains a load cell constructed in accordance with the present invention. The sensing arrangement of each load cell is coupled to the display assembly 76 via peripherally located conductors 78. When a load is placed on the platform 72, the load is distributed among the load cells in each of the support members 74. Each load cell generates an electrical signal which is indicative of the percentage of the total load being supported by the load cell. The display assembly 76 includes electrical circuitry (not shown) for receiving the electrical signals generated by the load cells and summing the signals up to display the weight of the total applied load. Such electrical circuitry is well known in the art. An example of such circuitry can be found in the copending U.S. patent application Ser. No. 08/385,349 mentioned earlier.

Figure 4:
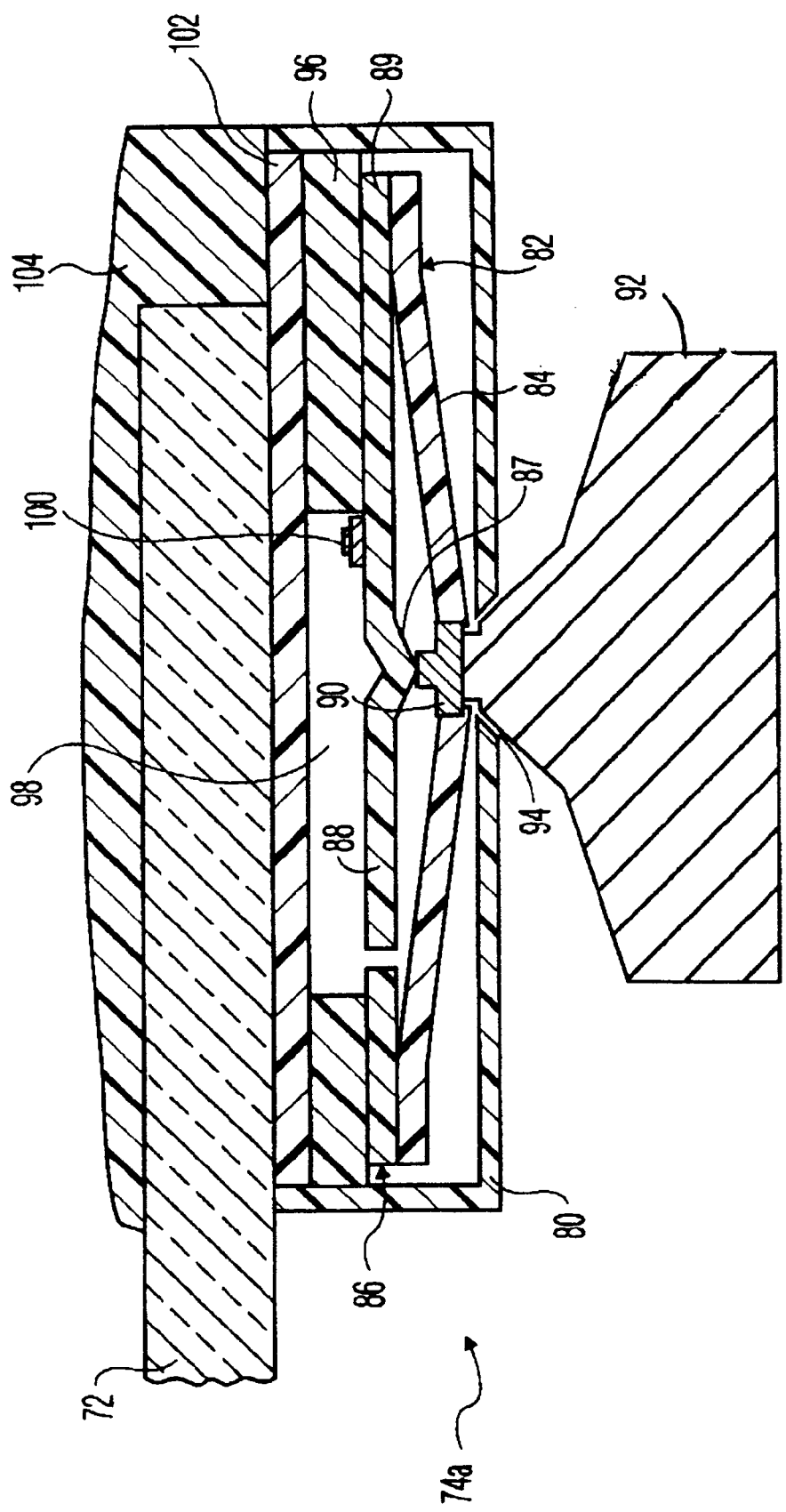
FIG. 4 is a partial cross-sectional view through line 1—1 of the support member 74a shown in FIG. 3.

Referring to FIG. 4, a partial cross-section through the support members 74a of the scale 70 is shown. Since the support members 74a–74d are substantially alike (except for the inclusion of a switch in only two of the four support members 74a–74d as will be explained later), the description of the support member 74a applies equally to the other support members 74b–74d.

Generally the support member 74a comprises a unitarily formed housing 80 for enclosing the mechanical and electrical components of the support member 74a. The housing 80 is preferably molded from a durable material such as plastic resin. However, the housing 80 can be fabricated from any suitable material known in the art.

Disposed within the housing 80 is a biasing element 82 with a spiral-shaped center portion 84 and a load cell 86 similar to the one embodied in FIG. 1. An inverted T-shaped metal element 90 is molded into the spiral-shaped center portion 84 of the biasing element 82. The spiral-shaped center portion 84 of the biasing element 82 biases the inverted T-shape element 90 against the projection 87 of the load cell 86. A foot member 92 extends through an opening 94 in the housing 80 for transferring a load to a load cell 86 via the inverted T-shaped element 90.

The plate 89 of the load cell 86 and the biasing element 82 are secured to a rigid plate member 96. The rigid plate member 96 includes a cut out 98 which lies directly over the E-shaped deflectable member 88. The cut out enables the E-shaped member 88 to deflect without obstruction in response to an applied load.

An on/off power switch 100 is optionally provided in the support member 74a. Only two of the four support members include the power switch 100. The configuration and function of such switches are well known in the art. In general, the power switch 100 operates to power up the scale 70 upon the application of a predetermined load such as ten pounds. When the load is removed, the switch 100 turns off the scale 70.

A closure 102 extends across the opening of the housing 80 directly over the rigid plate member 96. The support member 74a is attached to bottom surface of the platform 72 (at the corner) via the closure 102 using an adhesive or any other suitable attaching arrangement. A cap 104, molded from plastic resin, or any other suitable material, covers the top surface of the platform 72 and attaches to the closure 102. The cap 104 lends an aesthetically pleasing appearance to the scale 70.

When a person stands on the platform 72, the load exerted on the support member 74a is transferred via the foot portion 92 and the inverted T-shaped metal element 90 to the projection 87 on the E-shaped deflectable member 88 of the load cell 86. The load causes the beams (not shown) of the E-shaped deflectable member 88 to bend which causes the strain sensing arrangement disposed thereon to generate an electrical signal that is indicative of the load applied to the deflectable member 88.

It should be understood that the embodiments described herein are merely exemplary and that a person skilled in the art may make many variations and modifications to these embodiments utilizing functionally equivalent elements to those described herein. For example, the circularly-shaped plate and the support members may be any other suitable shape if desired.

Any and all such variations or modifications as well as others which may become apparent to those skilled in the art, are intended to be included within the scope of the invention as defined by the appended claims.

What is claimed is:

1. A load cell for an electronic scale, comprising:
    a substantially flat plate having at least one C-shaped aperture, said at least one C-shaped aperture defining a substantially E-shaped deflectable member having three beams which form the arms of said substantially E-shaped deflectable member; and
    sensor means disposed on at least one of said three beams, for generating an electrical signal in response to an applied load to said E-shaped deflectable member of said load cell, said electrical signal being indicative of the applied load;
    wherein two of said beams each include a conical-shaped projection which concentrates said applied load to said E-shaped deflectable member.

2. The load cell according to claim 1, wherein said at least one C-shaped aperture comprises first and second C-shaped apertures, said second C-shaped aperture substantially surrounding said first C-shaped aperture.

3. The load cell according to claim 2, wherein said C-shaped apertures face toward one another other.

4. The load call according to claim 1, wherein said three beams includes two outer beams and one inner beam, said two projections being defined on said outer beams.

5. The load call of claim 1, wherein said three beams includes two outer beams and one inner beam, said sensor means being disposed on said inner beam.

6. The load cell according to claim 1, wherein said sensor means includes first and second strain gauges, wherein deflection of said E-shaped deflectable member places said first strain gauge into tension and said second strain gauge into compression.

7. The load cell according to claim 1, wherein said sensor means comprises at least one half bridge structure.

8. An electronic scale for displaying the weight of a load applied to said scale, comprising:
    a platform;
    a plurality of support members attached to said platform for elevating said platform above a supporting surface, each of said support members supporting a portion of the load, wherein each of said support members includes a load cell having a substantially flat plate including at least one C-shaped aperture, said at least one C-shaped aperture defining a substantially E-shaped deflectable member having three beams which form the arms of said substantially E-shaped deflectable member, and sensor means disposed on at least one of said three beams, for generating an electrical signal in response to a load applied to said E-shaped deflectable member of said load cell, said electrical signal being indicative of the load; and
    display means for receiving said electrical signals generated by said load cells in each of said support members and displaying the weight of the applied load;
    wherein two of said beams each include a conical-shaped projection which concentrates said applied load to said E-shaped deflectable member.

9. The scale according to claim 6, wherein said at least one C-shaped aperture comprises first and second C-shaped apertures, said second C-shaped aperture substantially surrounding said first C-shaped aperture.

10. The scale according to claim 9, wherein said C-shaped apertures face toward one another other.

11. The scale according to claim 8, wherein said three beams includes two outer beams and one inner beam, said two projections being defined on said outer beams and said sensor means being defined on said inner beam.

12. The scale according to claim 8, wherein said sensor means includes first and second strain gauges, wherein deflection of said E-shaped deflectable member places said first strain gauge into tension and said second strain gauge into compression.

13. The scale according to claim 8, wherein said sensor means comprises at least one half bridge structure.

14. A load cell for an electronic scale, comprising:
    a substantially flat plate having a first C-shaped aperture and a second oppositely faced C-shaped aperture substantially surrounding said first aperture, said first C-shaped aperture defined by first and second portions of uniform width in parallel alignment along their entire length and a third portion perpendicular to said first and second portions and coupled at a first end to said first portion and at a second end to said second portion, said second C-shaped aperture defined by first and second portions of uniform width in parallel alignment along their entire length and a third portion perpendicular to said first and second portions and coupled at a first end to said first portion and at a second end to said second portion, defining an E-shaped deflectable member having three beams which form the arms of said E-shaped deflectable member, said three beams comprising two outer beams, each beam having a top surface of uniform width extending the entire length of said first and second portions of said first C-shaped aperture, and an inner beam, wherein said inner beam includes a conical shaped projection formed on a top surface of said inner beam which concentrates an applied load to said E-shaped deflectable member; and
    sensor means disposed on said two outer beams for generating an electrical signal in response to a load applied to said E-shaped deflectable member of said load cell, said electrical signal being indicative of the applied load.

* * * * *